Patented Sept. 13, 1932

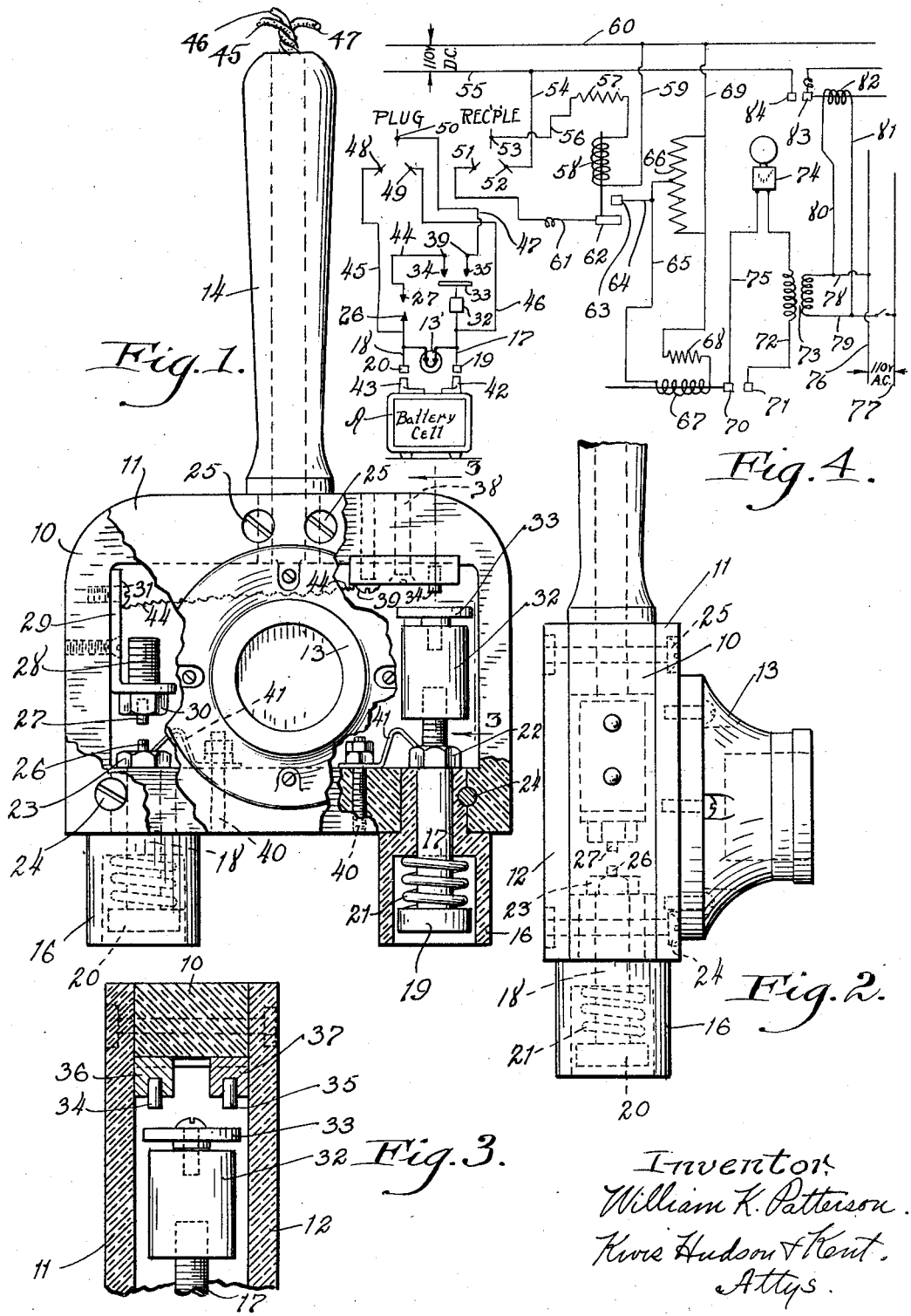
Sept. 13, 1932.    W. K. PATTERSON    1,877,041
METHOD AND MEANS FOR TESTING STORAGE BATTERIES
Filed Feb. 2, 1929

1,877,041

UNITED STATES PATENT OFFICE

WILLIAM K. PATTERSON, OF LAKEWOOD, OHIO, ASSIGNOR TO WILLARD STORAGE BATTERY COMPANY, OF CLEVELAND, OHIO, A CORPORATION OF WEST VIRGINIA

METHOD AND MEANS FOR TESTING STORAGE BATTERIES

Application filed February 2, 1929. Serial No. 337,128.

This invention relates to a method and means for testing storage batteries, more particularly for testing the individual cells of storage batteries before they are filled with electrolyte in order to discover and correct any short circuits which may be present in the cell due to any one of various causes, as missing separators or insulators, a lead tear projecting from a plate surface and touching a plate of opposite polarity, material lodged on top of a separator and electrically connecting the plates on either side thereof, and lead particles lying across plates and causing short circuits. It is, of course, highly important to eliminate defects of this sort before a battery is assembled, and my invention is designed to assist the workmen or inspector in discovering such defects.

One of the objects of the invention is the provision of a method for testing storage batteries, in which the operator is apprised first as to whether or not the apparatus has been properly applied to the battery, and then is given an indication in the event that a short circuit is present.

Another object is the provision, in connection with the method above referred to, of means for causing the short circuit to burn marks upon the adjacent plates in order that the exact location of the short circuit may be clearly indicated.

A further object is the provision of special apparatus for carrying out the method above described, including a lamp which is illuminated only when good contact with both of the battery cell terminals has been made, and including an electric signal which is adapted to be actuated only when the resistance in the battery cell being tested is low on account of one or more short circuits.

Another object is the provision of a tool or handled casing carrying yieldable contacts for closing an electrical circuit.

Still another object is the provision of means for preventing the illumination of the lamp in the event that the supply of electric power for the short circuit signal should fail.

Another object is the provision of an electric system to accomplish the testing of storage batteries by means of the method and apparatus above referred to.

Other objects and features of novelty will appear as I proceed with the description of that embodiment of the invention which, for the purposes of the present application, I have illustrated in the accompanying drawing, in which—

Fig. 1 is an elevational view, partly broken away and partly in section, of a handled casing carrying plunger contacts employed in connection with the invention;

Fig. 2 is a side elevation of Fig. 1;

Fig. 3 is a sectional detail view taken substantially on the line 3—3 of Fig. 1; and Fig. 4 is a wiring diagram of the electric system.

In the drawing the casing is shown as made up of a hollow fibre block 10 of approximately rectangular form, on the front and rear faces of which are secured fibre covers 11 and 12, respectively. To the front cover 11 there is attached a lamp receptacle 13 of any suitable character. For convenience in manipulating the casing it is preferably provided with a hollow handle 14 through which extend the electric conductors later to be described.

In the bottom of the casing I mount at the proper distance apart two hollow fibre guides 16, provided in their outer portions with relatively large bores to surround the terminals of a battery cell, and in their inner portions with smaller bores to slidably receive metal plungers 17 and 18 provided on their outer extremities with heads to form contacts 19 and 20, respectively. The plungers and their contacts are normally held in extended position by coil springs 21 surrounding the plungers and bearing against the heads thereof. Nuts 22 and 23 are threaded upon the threaded inner ends of the plungers and are adapted to bear against the inner ends of the guides 16 to limit the outward movement of the plungers. The guides 16 may be locked in place by bolts 24 which serve also to fasten the covers 11 and 12 to the hollow block 10 of the casing. Similarly, bolts 25 in the upper part of the casing hold the covers 11 and 12 thereon and lock the handle 14 against withdrawal or turning.

A small tungsten plug 26 is set into the upper end of plunger 18 and is adapted to contact with a similar tungsten plug 27 set into the lower end of a bolt 28, the latter being threaded into an opening in a copper angle bracket 29 and held in place by a lock nut 30. The bracket 29 is secured to one of the inner walls of the hollow block 10 by screws or the like, one of said screws 31 constituting also a binding post.

Plunger 17 extends upward further than plunger 18 and carries upon its upper end a block 32 of insulation material, on the upper end of which is mounted a metal contact disc 33 which is adapted to engage simultaneously with two tungsten plugs 34 and 35 mounted in metal blocks 36 and 37, respectively, which are supported from the fibre block 10 by screws 38 or the like. Each of the metal blocks 36 and 37 carries a binding post 39.

In the bottom of casing block 10 I mount a pair of binding posts 40 which also constitute anchors for resilient connectors 41, the free ends of which contact with the nuts 22 and 23 and maintain such contact throughout the movements of the plungers 17 and 18.

In Fig. 4 I have illustrated at A a battery cell to be tested, having terminals 42 and 43. The contacts 19 and 20 on the lower ends of the plungers are shown directly above the terminals in the position which they would be caused to take just prior to the lowering of the casing for the testing of the cell. A lamp 13' is connected across the contacts 19 and 20 so as to be in parallel with the battery cell. The contacts 27 and 34 are connected by a conductor 44. Connected with the plunger 18, which in practice is accomplished through the binding post 40, is a conductor 45 that extends upwardly out of the casing through the handle 14 thereof. A second conductor 46, connected with the plunger 17 through the intermediacy of binding post 40 and resilient connector 41, also extends upwardly through the hollow handle 14. A third conductor 47, electrically connected with the contact 35, is likewise carried up through the handle 14, and these three conductors terminate in contacts 48, 49 and 50, respectively, of a three-way plug.

The receptacle into which this plug is adapted to be inserted embodies three female contacts 51, 52 and 53 adapted to receive the contacts 48, 49 and 50 of the plug. From the contact 52 a conductor 54 leads to one wire 55 of a D. C. line. From the contact 53 a conductor 56 leads through resistance 57 and an electromagnet coil 58 to a further conductor 59 that is connected with the other wire 60 of the D. C. line. The resistance 57 is rather high, so that the coil 58 draws only a small amount of current.

From the contact 51 a conductor 61 leads to a switch contact 62 mounted upon the end of the armature of the coil 58. The other switch contact 63 is adapted to be engaged by the contact 62 whenever the coil 58 is energized. From the contact 63 a conductor 64 leads to a conductor 65 in which the current divides, a portion of it flowing through the rheostat 66 and a portion through the electromagnet coil 67 and resistance 68 to a conductor 69 that is connected with the line wire 60.

The electromagnet coil 67 controls a movable contact 70 which is adapted, when the coil 67 is sufficiently energized, to engage with a fixed contact 71. From the latter contact a conductor 72 leads through the secondary coil of a transformer 73 to a bell 74 or other electric signal, and from the bell another conductor 75 leads back to the contact 70. The transformer 73 receives its power from an A. C. power line 76, 77 through conductors 78, 79, and from these conductors a pair of wires 80, 81 lead to an electromagnet coil 82 which is adapted to shift a movable contact 83 into engagement with a fixed contact 84, thereby closing the wire 55 of the D. C. line. Obviously, this arrangement disables the entire D. C. portion of the testing apparatus whenever the current in the A. C. line fails for any reason whatever.

When it is desired to test a cell, the plug carrying contacts 48, 49, 50 having been inserted in the receptacle carrying contacts 51, 52, 53, the operator grasps the handle 14 and positions the casing 10, 11, 12 over the cell so as to cause the two hollow guides 16 to surround the terminals 42, 43 of the cell. He then presses down the casing, causing the contacts 19, 20 on the plungers 17, 18 to recede into the casing. As soon as the contacts 26, 27 are in engagement with each other and the contacts 34 and 35 are in engagement with the contact disc 33, a circuit is completed from the line wire 55 through conductor 54, contact 52, contact 48, conductor 45, contacts 26 and 27, conductor 44, contact 34, disc 33, contact 35, conductor 47, contact 50, conductor 53, conductor 56, resistance 57, magnet coil 58 and conductor 59 to line wire 60. The magnet coil 58 is thus energized and the contact 62 is caused to engage the contact 63. This completes a circuit through the lamp 13' as follows: From line wire 55, through conductor 54, contacts 52 and 48, conductor 45, lamp 13', conductor 46, contacts 49 and 51, conductor 61, contacts 62 and 63, conductor 64, rheostat 66 and conductor 69 to line wire 60. The operator then knows that he has made satisfactory connection between the contacts 19, 20 and the cell terminals 42, 43; and if nothing else happens he knows that the cell is free from short circuits. This is true regardless of the character of the separators which may be employed. Where rubber separators are used they are inserted dry and form almost perfect insulation between the plates of the cell. Hence, all of the current available flows through the lamp 13'. If wood separators are used they are inserted wet, and the moisture in them reduces their resistance. Hence, the current divides and more or less of it flows through the battery cell. In the latter event the voltage drop around the lamp is somewhat decreased. A lamp is selected having a resistance such that the voltage drop across it where wet wood separators are used in the cell will be at least 70 volts. Of course, if separators which are more perfect insulators are used, the voltage drop around the lamp will be greater.

Now, should there be a short circuit in the battery cell, the resistance to current flow through a cell will be much decreased, the voltage drop around the lamp will be much lower and the lamp will be extinguished. There will then be enough voltage available across the coil 67 to move the armature thereof so as to cause contact 70 to engage with contact 71 and close the bell circuit, whereupon the bell will ring and the operator will be apprised of the fact that there is a short circuit in the cell. He then permits contacts 19 and 20 to remain in engagement with the terminals 42 and 43 for a short time longer, whereupon the short circuit in the cell heats up sufficiently to burn marks upon the adjacent plates, thereby apprising the operator of the exact location of the trouble. The rheostat 66 limits the current through the cell to about 22 amperes, which is sufficient to "burn" a short circuit.

While in the foregoing description and in the accompanying drawing I have disclosed with some particularity one embodiment of the invention, such disclosure is primarily for the purpose of fully illustrating the invention and is not to be construed as constituting any limitation upon the scope thereof.

Having thus described my invention, I claim:

1. A method of testing storage batteries and the like, which comprises connecting the terminals of the battery into a testing circuit having associated therewith an electric indicating circuit, supplying current to said testing and indicating circuits to operate the latter, and supplying additional current to the testing circuit in the event of a short circuit in the battery being tested, to cause the generation of sufficient heat at the point of short circuit to indicate the location of the latter within the battery.

2. A method of testing storage batteries for short circuits, which comprises connecting the terminals of a battery cell in parallel with an electric indicating circuit including a resistance, supplying current to said parallel circuits, whereby the indicating circuit is energized sufficiently to give a positive indication under normal conditions and fails to give such indication when the resistance through the cell is appreciably reduced owing to a short circuit therein, and in the latter event passing sufficient current through said cell to cause the generation of heat at the point of short circuit within the cell.

3. A method of testing storage batteries for short circuits, which comprises connecting the terminals of a battery cell in parallel with an electric indicator, applying current to said parallel circuits, connecting with said parallel circuits means for energizing an electric signal when the voltage across the indicator terminals is materially decreased owing to a short circuit in the battery cell, and passing sufficient current through said cell to cause the generation of heat at the point of short circuit and thereby indicate the location of the latter.

4. In an apparatus for testing storage batteries, a casing, an electric circuit, a pair of normally spaced contacts for said circuit in said casing, a pair of plunger contacts carried by the casing adapted to engage spaced battery terminals, one of said plunger contacts being adapted to move one of said normally spaced contacts into engagement with the other normally spaced contact.

5. In an apparatus for testing storage batteries, a casing, an electric circuit having two normally open portions in said casing, a pair of yieldable plunger contacts carried by the casing adapted to engage spaced battery terminals, each of said plungers carrying means for closing one of said normally open portions of the circuit, said means being adapted to be operated by the movement of the plunger contacts resulting from their firm engagement with said battery terminals.

6. In an apparatus for testing storage battery cells, a casing, a pair of spring-pressed plungers mounted in said casing, said plungers being so spaced as to be adapted to engage simultaneously the terminals of a battery cell, an electric lamp, a circuit therefor adapted to be closed only when both of said plungers have been moved against the pressure of their springs, and electric signal control means in circuit with said plungers adapted to be operated when the normal electric resistance through the cell being tested is materially lessened because of a short circuit.

7. In an apparatus for testing storage battery cells, a casing, fixed hollow guides carried thereby adapted to receive the terminals of a battery cell, a pair of spring-pressed plungers mounted in said guides, an electric lamp, a circuit therefor adapted to be closed only when both of said plungers have been moved against the pressure of their springs, and electric signal control means in circuit with said plungers adapted to be operated when the normal electric resistance through the cell being tested is materially lessened because of a short circuit.

8. A testing apparatus for use with storage batteries, comprising means for electrically bridging the terminals of a battery cell, an electric lamp in said bridging means, a test line including said cell and said bridging means, a switch in said line, means for closing said switch when said bridging means is brought into operative position, an electric signal circuit, and means in said test line for causing said signal circuit to be energized whenever the resistance in said cell decreases appreciably owing to a short circuit therein.

9. Apparatus for testing storage batteries, comprising a tool carrying a pair of contacts adapted to engage simultaneously with the terminals of a battery cell, a test line into which said contacts are connected, said test line being adapted to be connected with a power circuit, a resistance shunted across said contacts, a switch in said test line, means for closing said switch comprising a spring contact adapted to be moved into operative position when the contacts of said tool are pressed against said terminals, an electric signal circuit, a switch therefor, and means for electrically closing said last named switch when the voltage drop across said resistance is materially lowered owing to a short circuit in the battery cell being tested.

10. Apparatus for testing storage batteries, comprising means for electrically bridging the terminals of a battery cell, said means including an electric resistance, a test line including said bridging means, a signal circuit, means for supplying electric current thereto, a switch for said signal circuit, means in said test line for closing said switch whenever the voltage drop across said resistance is materially decreased by a short circuit in the battery cell being tested, and means for opening said test line whenever the means for supplying current to the signal circuit is disabled.

11. Testing apparatus of the character described, comprising a signal circuit, a control for said circuit, a testing circuit in which said control is located, said testing circuit including a resistance great enough to lower the voltage available for said control below the amount necessary to operate the control, and means whereby a cell to be tested may be included in a shunt around said resistance.

In testimony whereof, I hereunto affix my signature.

WILLIAM K. PATTERSON.